(12) United States Patent
Hau

(10) Patent No.: US 7,175,367 B2
(45) Date of Patent: Feb. 13, 2007

(54) CABLE PULLING MACHINE

(75) Inventor: Paul W. Hau, Watertown, WI (US)

(73) Assignee: Earth Tool Company, L.L.C., Oconomowoc, WI (US)

( * ) Notice: Subject to any disclaimer, the term of this patent is extended or adjusted under 35 U.S.C. 154(b) by 0 days.

(21) Appl. No.: 10/352,267

(22) Filed: Jan. 27, 2003

(65) Prior Publication Data

US 2004/0146361 A1 Jul. 29, 2004

(51) Int. Cl.
*F16L 1/00* (2006.01)
*B66D 1/00* (2006.01)

(52) U.S. Cl. .................. 405/184.3; 405/184; 254/249; 254/254; 254/134.3 R; 226/150; 226/163

(58) Field of Classification Search ................ 254/264, 254/254, 384, 245, 246, 249, 250, 251, 259, 254/134.3, 134.3 R; 226/128, 149, 150, 226/151, 160, 162, 163, 165, 146, 147; 405/154.1, 405/183.5, 184, 184.1, 184.3
See application file for complete search history.

(56) References Cited

U.S. PATENT DOCUMENTS

| | | | | |
|---|---|---|---|---|
| 4,480,816 A | * | 11/1984 | Gortan | 254/264 |
| 4,955,757 A | * | 9/1990 | Balling | 405/184 |
| 5,009,353 A | * | 4/1991 | Alquist | 226/172 |
| RE35,542 E | | 6/1997 | Fisk et al. | 405/156 |
| 6,168,062 B1 | * | 1/2001 | Varner et al. | 226/176 |
| 6,305,880 B1 | | 10/2001 | Carter et al. | 405/184.3 |
| 6,830,234 B2 | | 12/2004 | Tjader | 254/134 |
| 2002/0081155 A1 | * | 6/2002 | Putnam | 405/184 |

FOREIGN PATENT DOCUMENTS

WO   WO 98/30350   7/1998

OTHER PUBLICATIONS

"Lateral Bursting—Grundotugger," TT Technologies website, www.tttechnologies.com, 4 pages.
"Xpandit—Trenchless Pipe Replacement" brochure, Miller Pipeline Corporation, 1994, 8 pages.
"6 Ton Hydraulic Simm-Pul," Assembly and Operating Instructions, Bert Systems Ltd, 7 pages.
"I-150 Linear Winch," AmClyde Engineered Products, Inc., 1 page.

* cited by examiner

*Primary Examiner*—Sunil Singh
(74) *Attorney, Agent, or Firm*—Philip G. Meyers

(57) ABSTRACT

A cable pulling machine of the invention includes a frame, a mechanical linkage including first and second links having first and second cable gripping shoes disposed thereon respectively in opposed positions, a latching cylinder actuable to cause the mechanical linkage to pivot on multiple axes to bring the shoes into engagement with a cable disposed therebetween, a main cylinder having one end mounted on the frame and actuable to move the linkage in a manner effective to pull the cable in a pulling stroke once the latching cylinder has brought the shoes into engagement with the cable, and a mechanism for extending and retracting the main and latching cylinders. The machine may also include a mechanism for holding the cable in tension between pulling strokes, such as a pivoting wedge mechanism as described hereafter.

23 Claims, 13 Drawing Sheets

CABLE PULLING MACHINE

FIELD OF THE INVENTION

The invention relates to cable pulling machines of the type used for pulling an underground mole through a pipeline in order to burst the pipeline.

BACKGROUND OF THE INVENTION

Methods and devices to replace existing sanitary sewer pipes by pipe bursting are well known in the water and sewer industry. These pipe-bursting methods have been in use for at least 15 years. Laterals, those short lengths of pipes that connect a commercial or residential building to the 'main' or collector pipe in the adjacent right-of-way, can be replaced using pipe bursting. Replacement of laterals using pipe-bursting is becoming nearly as common as replacement of the main.

There are many reasons the pipe that makes up the lateral might need replacement. Most often the cause is tree roots that grow into the joints between pipe sections. Over time, as these roots grow thick from their successful search for water, the pipes will begin to crack. The gaps will widen and permit an inflow of ground water into the sanitary system. The first clue that these roots are in the sewer lateral may be in the form of a backup. The homeowner or landlord, who is often legally responsible for the condition of the pipe traversing the property, may call a plumber who can remove the roots, by a process often referred to as 'roto-rooting'.

While the roots may be removed from the interior of the pipe by this process, and blockage may not occur again for months or years, the existence of the damaged pipe creates a bane for the local sewer district. Upon entering a period of rainfall, the water table will rise and ground water, usually referred to as clear water, will enter into the sewer through the leaks caused by the roots. This water, now mixed with the sanitary flow must be treated as sewage. Unfortunately, rainfall may cover the entire sewer district, and the existence of leaking laterals is more common than not in older areas. For this reason, many municipalities experience sanitary flow beyond their capability to process when even moderate rainfall is experienced. For example, Milwaukee, Wis. regularly discharges untreated sewage into Lake Michigan. Further, the District of Columbia has an average of (70) discharges of untreated raw sewage into the Anacostia River each year. The source of these increased flow rates is always at least partially due to leaking pipes allowing ground water to enter the system.

The device and method of the invention are an improvement on a basic concept used in pipe bursting. A cyclic winch applies tension to a wire rope. The rope is further attached to a pipe-bursting device. The device or "mole" may be a simple conical shape, an air-actuated impact tool, a hydraulically actuated device that expands radially upon demand, or when slitting steel, it may be a bladed slitter using can-opener like blades to separate the pipe and allow subsequent expansion. The known process calls for the simultaneous installation of High-Density Polyethylene pipe (hereafter HDPE) or similar product pipe. The product pipe is towed behind the pipe-bursting device.

While cyclic winch devices of this type currently exist, and have existed for more than a decade in the pipe bursting field, such use either completely hydraulically induced grip forces, or in some designs, the grip is entirely self-actuating. In the case of the completely hydraulically induced grip device, the magnitude of the grip on the rope is independent of the pulling force. For this reason, the grip force applied on every cycle must be capable of keeping the rope from slipping should maximum rope tension be needed. This full grip force is applied whether the current job conditions require it or not.

As the grip force applied to the rope perpendicular to the rope's axis is generally 4 to 6 times the tension force, each gripping cycle can cause fatigue damage to the rope's individual wires.

A seemingly improved alternative is to use self-actuating clamp. In this case, friction-inducing teeth, which are actually grooves with sharp edges located on the clamping surface, will start the gripping process. This self-actuating device, which may be either a pair conical collets, wedge shaped, or a four bar linkage, creates a gripping force that is proportional to the axial rope tension. With such a device, the grip force, while still 4 to 6 times the ropes axial tension, need only go high enough to keep the grip from slipping. These devices have two weaknesses. During initiation, if dirt, grease or oil is present on the collet or rope surface, there may not be enough friction to induce or initiate the self-gripping process. Dirt, grease and other slick matter that may cause the rope not to initiate a grip are all substances that exist at the bottom of a sewer pipe. It should be assumed they will coat the wire rope and likely affect the dependability of the grip initiation process.

Further, the sharp edged grooves or teeth that help to initiate the grip when the cable tension is low, will damage the rope when loads are high. When the axial pull force is very high, the similarly high grip force may tend to cut the rope at locations where the collets have sharp features to initiate the process. Thus, what initially seemed like a good technical alternative, has functional weaknesses. The present invention addresses these weaknesses.

SUMMARY OF THE INVENTION

A cable pulling machine of the invention includes a frame, a mechanical linkage including first and second links having first and second cable gripping shoes disposed thereon respectively in opposed positions, a latching cylinder actuable to cause the mechanical linkage to pivot on multiple axes to bring the shoes into engagement with a cable disposed therebetween, a main cylinder having one end mounted on the frame and actuable to move the linkage in a manner effective to pull the cable in a pulling stroke once the latching cylinder has brought the shoes into engagement with the cable, and suitable means for extending and retracting the main and latching cylinders. The machine may also include suitable means for holding the cable in tension between pulling strokes, such as a pivoting wedge mechanism as described hereafter.

In a preferred form of the invention, the first link is secured to the frame by a first pivot at one end portion of the first link, and has the first shoe mounted thereon at a position offset from the first pivot. The first shoe has a first gripping surface configured for gripping a cable. The second link is secured to one end of the main cylinder, and the second shoe has a second gripping surface configured for gripping the cable, which second gripping surface opposes the first gripping surface. The latching cylinder is mounted at opposite ends thereof to the first and second links at positions effective for causing the first and second gripping surfaces to grip a cable disposed therebetween. The second link may be connected by a second pivot to an end of the main cylinder opposite the main cylinder end connected to the frame. The second link has the second shoe mounted thereon at a position offset from the second pivot. The latching cylinder is preferably pivotally mounted by third and fourth pivots mounted in holes in the first and second links respectively. At least one of the shoes may be pivotally mounted to its associated link by a shoe pivot, on which the shoe pivots as it tightens on the cable. The first and second links overlap one another in a lateral direction transverse to the pulling stroke, and are interconnected for relative rotation by a fifth pivot, the fifth pivot being located between the first and second pivots at a position effective to cause the links to bring the shoes together to grip a cable upon actuation of the latching cylinder. The lines of action of the links, defined hereafter, preferably start in a parallel or near-parallel condition and move to a beyond parallel condition defining an acute angle preferably ranging from about 5° to 15°. Such a linkage is configured to mechanically magnify gripping force applied to the cable by the latching cylinder, which latching cylinder exerts less force than the main cylinder, while at the same time not further increasing the gripping force once the shoes have engaged the cable and the shoes have moved beyond the parallel position.

According to a further aspect of the invention, a control unit is provided having a circuit valve which, upon actuation for a pulling stroke, activates the latching cylinder until a predetermined pressure is reached, and then activates the main cylinder. A manual control is provided to cycle the machine to perform a pulling stroke and then reset to a starting position to repeat for a successive pulling stroke.

A method for the trenchless replacement of an underground pipe using a cable pulling machine such as the foregoing includes the steps of:

disposing a pulling cable through the pipe with a pipe bursting mole attached to one end of the cable so that the mole is in position to burst the pipe starting at one end of the pipe;

positioning a cable pulling machine at the other end of the pipe in a position for pulling the mole therethrough; and pulling the mole through the pipe using the cable pulling device by successively actuating a latching cylinder of the cable pulling machine so that a pair of cable gripping shoes engage the cable, then actuating a main cylinder of the cable pulling machine to accomplish a pull on the cable, then releasing the cable by reverse actuation of the main and latching cylinders, then repositioning the pulling machine to engage a further length of the cable with the cable gripping shoes to complete a pulling cycle, and then repeating the pulling cycle in a series of pulling strokes.

Other aspects of the invention are set forth in the detailed description that follows. Among these are a cable pulling system that includes a hydraulic cable pulling machine, and a control stand including means for controlling flow of hydraulic fluid to the machine in combination with wheels and a platform suitable for lifting and transporting the machine thereon in the manner of a dolly. The machine may be the one described herein or one of a completely different design. Hoses are used to connect the control stand to the machine for conducting hydraulic fluid.

BRIEF DESCRIPTION OF THE DRAWINGS

In the accompanying drawings, wherein like numerals denote like elements.

DETAILED DESCRIPTION

Figure 1:
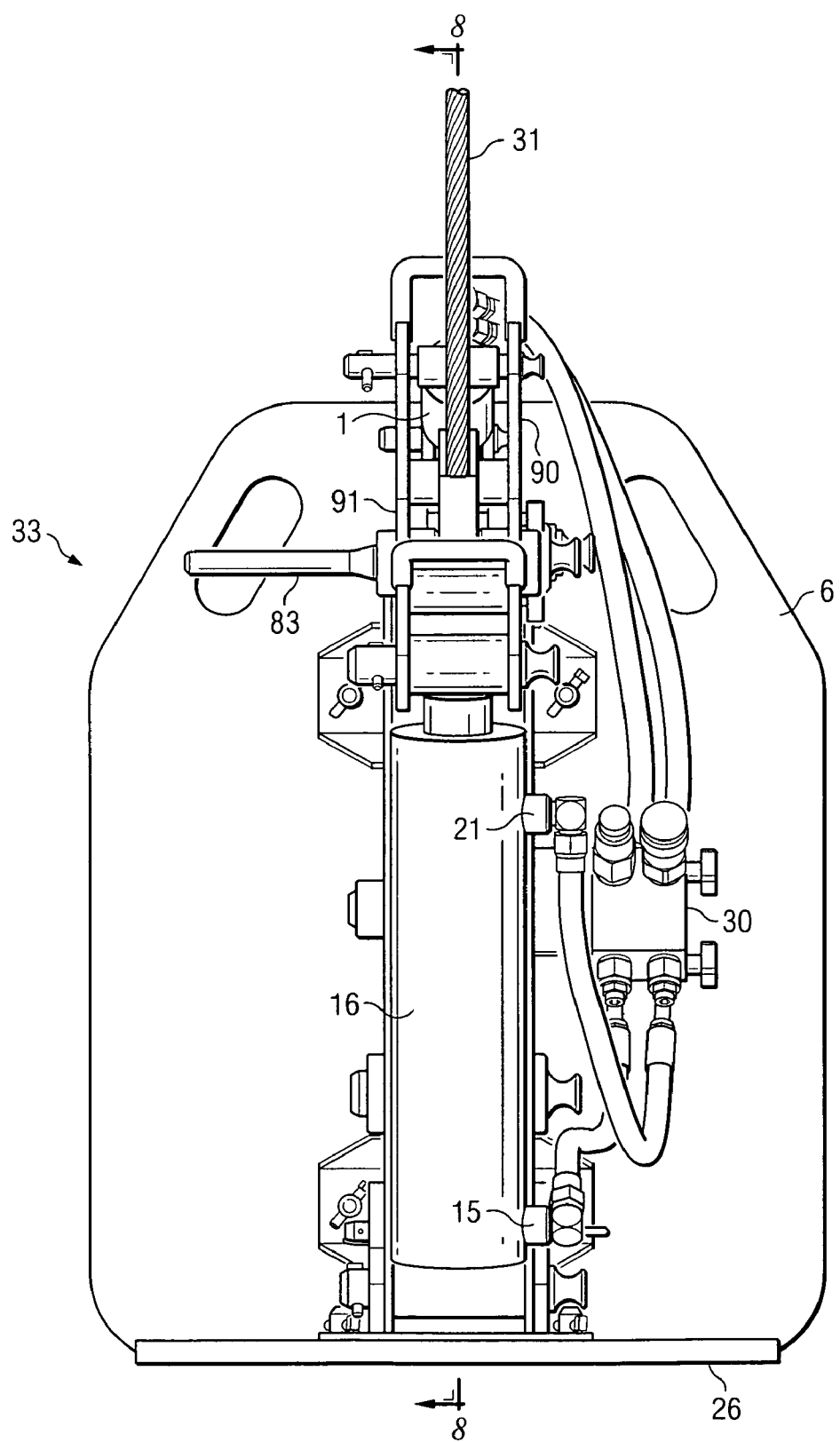
FIG. 1 is a front view of a wire rope pulling device of the invention, with the main extension cylinder is shown in the retracted position.

According to the invention, a latching cylinder is used to initiate gripping of the cable. The gripping mechanism is designed to geometrically increase the cable clamping force as the pulling force increases, preferably without the use of teeth on the cable pulling jaws. The puller of the invention uses a gripping mechanism unlike any collet. Additionally, unlike other four bar linkage designs, the device is initiated, or helped to start the grip, with a small hydraulic cylinder. As the axial wire rope load increases as the machine continues its cycle, the effect of the small hydraulic cylinder becomes unimportant. The mechanism builds gripping force in proportion to the magnitude of the axial pull force. By using the method described, the design overcomes the weakest aspect of collets, and also avoids the rope crushing nature of a simple hydraulic clamp. It is an evolutionary design change that makes the machine more dependable and useful than either a collet machine, or a full hydraulically induced grip design, or a non-hydraulically initiated four bar linkage.

In use, the cable pulling machine will normally be located in an excavation placed adjacent to either the connection to the main, or adjacent to the building structure. The machine, using 5 to 30 tons of axial wire rope tension, draws the pipe bursting device through the existing pipe, it splits or bursts the pipe and simultaneously expands the ground and installs the product pipe. Upon entering the exit pit, the pipe-bursting device is generally disconnected from the cable and the cable disengaged from the puller. These components are removed from the excavation, the pipe connections are completed and the pit will be filled in and the surface restored. To replace a typical 75 foot long lateral with 4" HDPE pipe, the entry and exit excavations may be 3' wide×4' long. Smaller excavations are possible, however that small size restricts the ability of the man to perform the pipe connections after the pipes have been burst or split.

The device of the invention acts by applying tension to a wire rope and pulling that rope through a distance. The following description will detail the cyclic nature of that process and other related functions.

Referring to FIGS. 1–9, when an operator shifts the handle 37 for a hydraulic spool valve 45, pressurized hydraulic oil flows to a sequencing valve 30. The sequencing valve 30 functions to direct flow to two separate components in chronological order. That is, flow will go to the first circuit until a predetermined pressure is reached within the valve body. Upon attaining that pressure, the second circuit will then receive oil, as explained hereafter.

Figure 8:
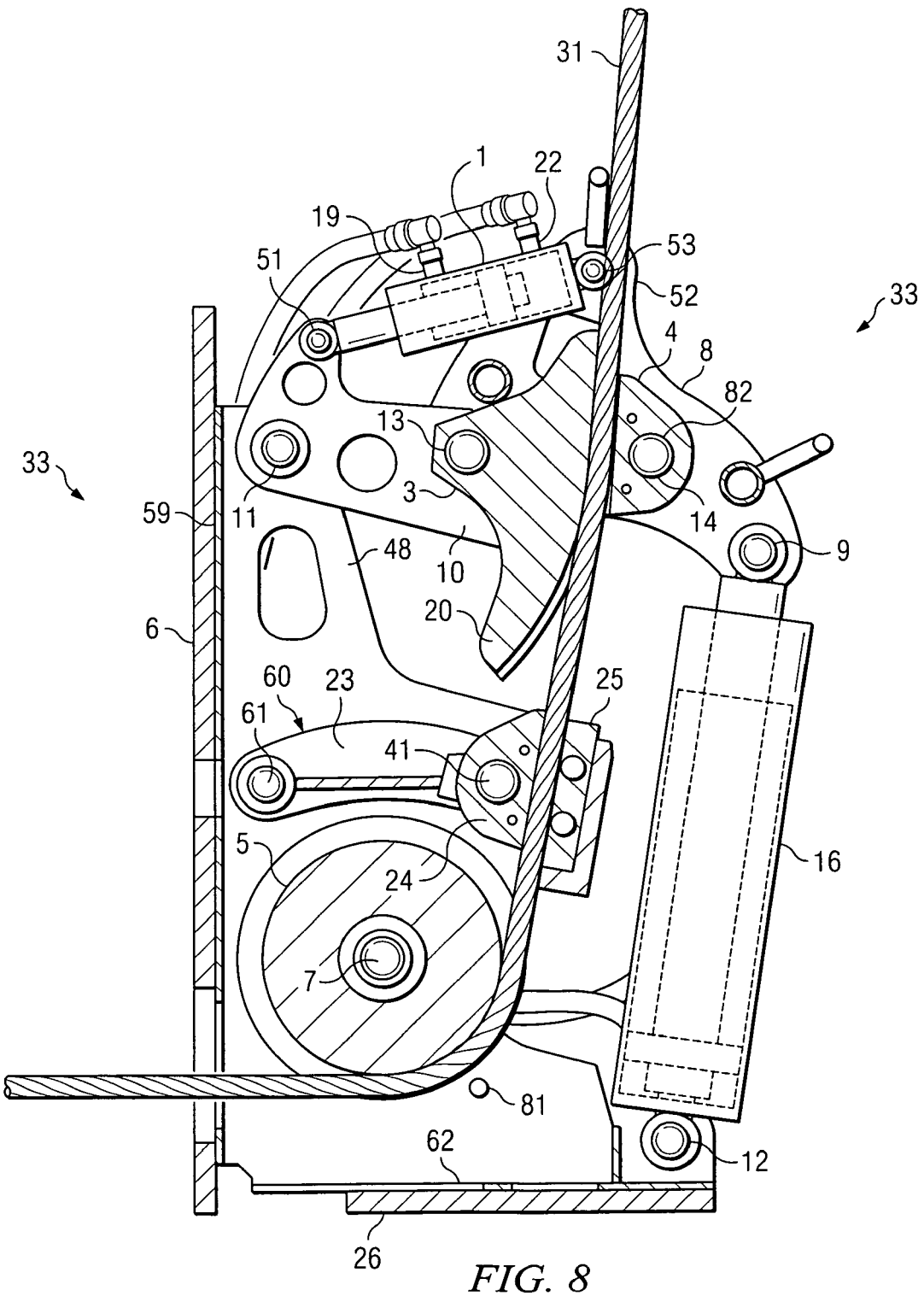
FIG. 8 is a sectional view taken along the line 8–8 in FIG. 1, with the device shown at the start of a pull.
Figure 9:
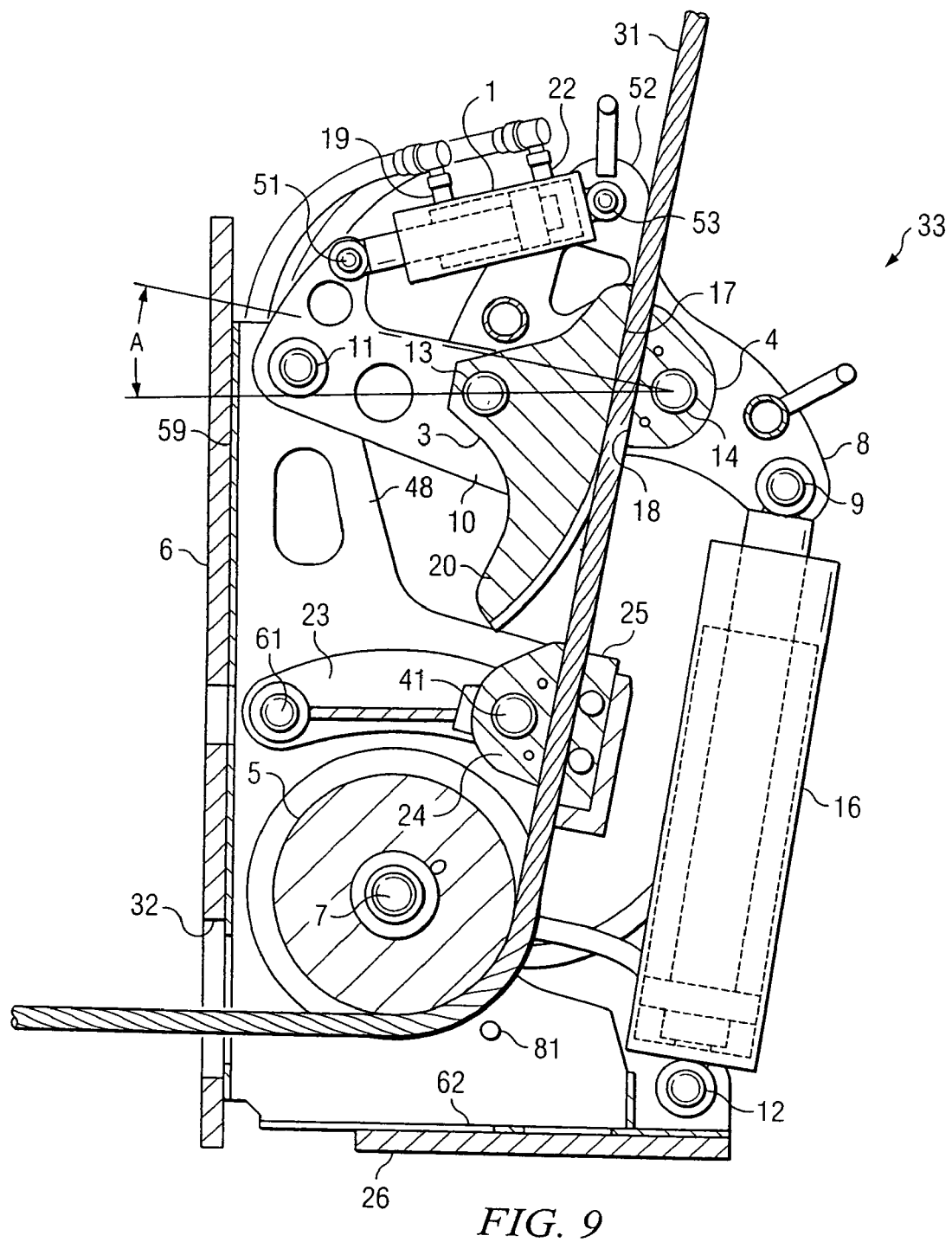
FIG. 9 is a sectional view taken along the line 8–8 in FIG. 1, with the device shown grabbing the wire rope.

A pulling device or machine 33 of the invention includes a first hydraulic cylinder 1, known as the latching cylinder because it acts as an over-center latch for the gripping mechanism. This double-acting cylinder 1 is designated as the first circuit in the hydraulic system. Ported with an inlet 19 to receive oil on the rod side, actuation of cylinder 1 will cause the rod to retract. Retraction of cylinder 1 causes rotation of a first link 10 about a pin joint 11 and about a pin 13 mounted on a second floating link 8 (FIGS. 8–9). Pin 11 is mounted on a frame 48 of the pulling machine and does not otherwise move relative to the linkage to be described. One end of cylinder 1 is pivotally connected by a pin 53 to an upward extension 52 of link 8. Accordingly, retraction of cylinder 1 causes link 10 to pivot clockwise about pin 11, rotating link 10 downwardly to the position shown in FIG. 9. Pin 13 moves downwardly and transmits such movement to link 8 to which it is connected.

Link 8 rotates about pin joints 9 and 13, and a second cylinder 16 will rotate slightly about pins 12 and 9 at its opposite ends. Pivots 11 and 12 are rotatably mounted by brackets on an end wall 59 and base plate 62 of frame 48, and brace the linkage so that forces generated during pulling are transmitted to the frame which has been braced against suitable surfaces, such as the side and floor of an excavation.

A first gripping shoe 3 is rigidly attached to link 10 at the end remote from pin 11 and will follow an arcuate path about pin 11. The transition between the positions of FIGS. 8 and 9 is the result of these movements. Cylinder 1 is mounted by pivot pins 51, 53 at either end to links 8, 10 respectively and pulls the upper portions of links 8, 10 closer together as it contracts.

As cylinder 1 completes its stroke, a second shoe 4 makes a slight angular adjustment about a pin 14 by which it is mounted on link 8 at the end remote from pin 9. This angular adjustment is the product of mating to a cable or wire rope 31 in a clamping manner. Shoes 3, 4 have opposed, semi-cylindrical gripping surfaces 17, 18 configured to grip a cable of the desired diameter. Surfaces 17, 18 may be plain or knurled, but preferably lack teeth or other sharp projections that would tend to cut the cable. Shoes 3, 4 are aligned to keep the wire rope 31 trapped between the shoes during device operation. The profile of rope 31 will be centered within the lateral confines of shoes 3, 4.

Figure 2:
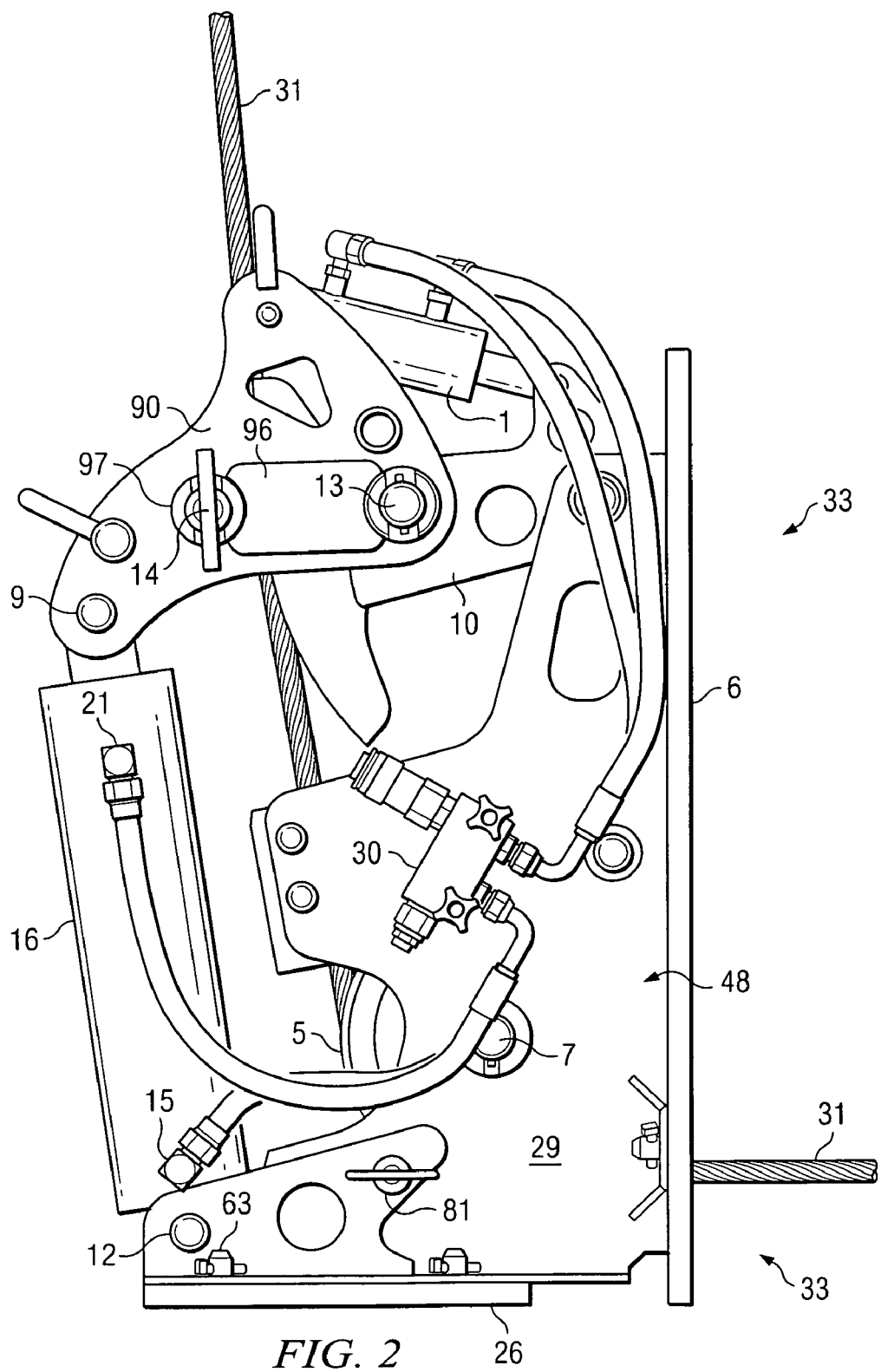
FIG. 2 is a right side view of the device of FIG. 1.
Figure 3:
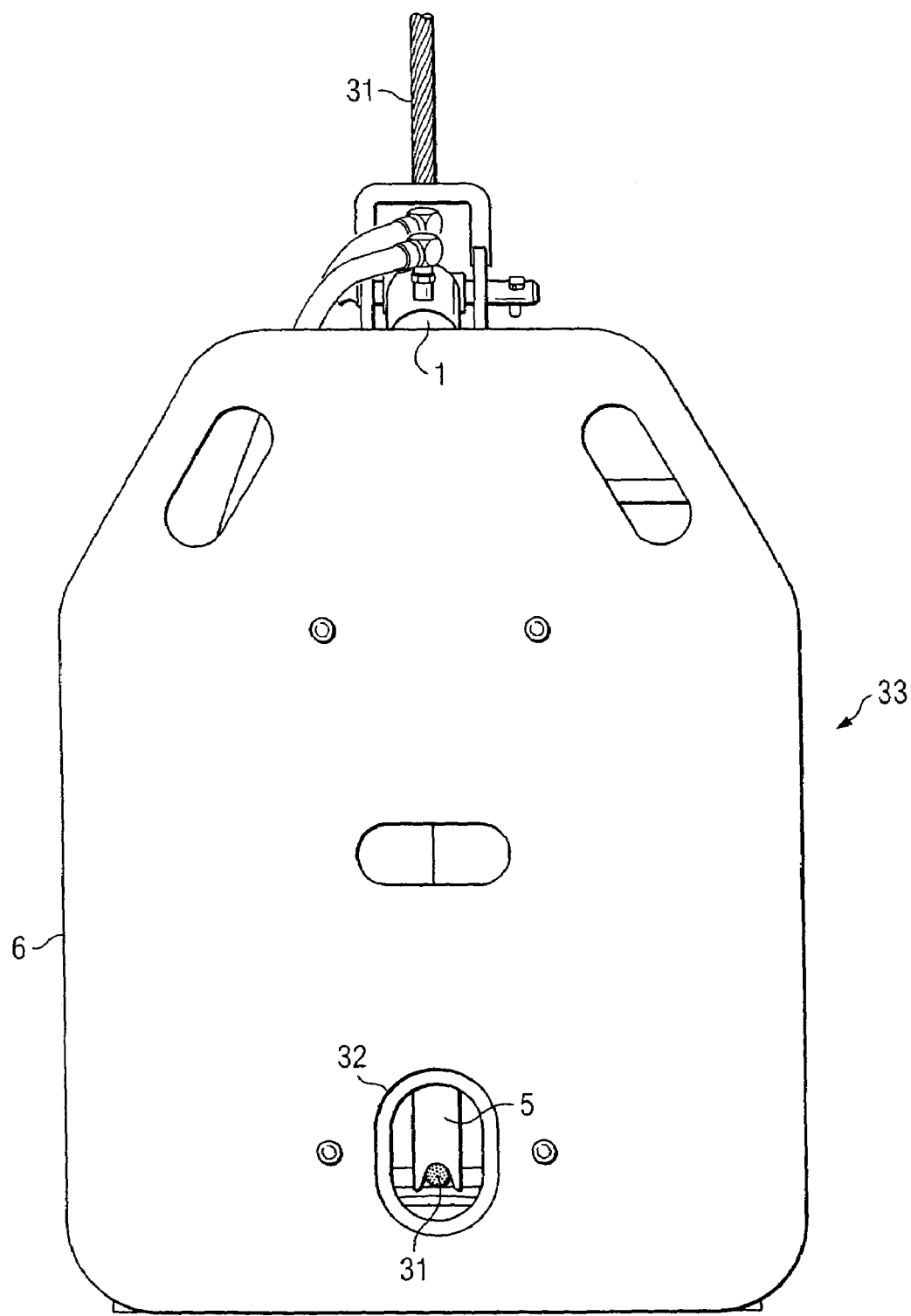
FIG. 3 is a back view of the device of FIG. 1.
Figure 4:
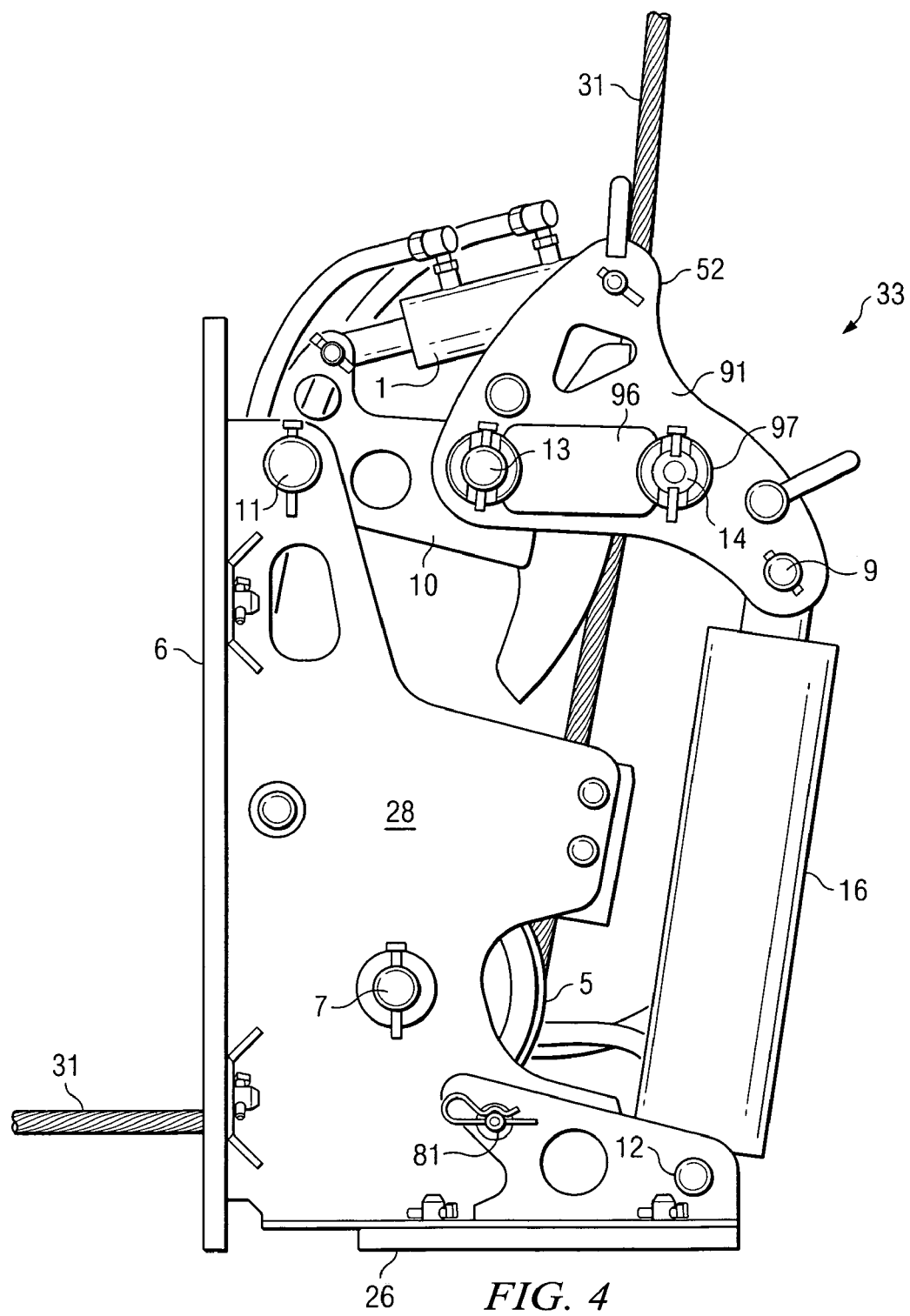
FIG. 4 is a left side view of the device of FIG. 1.
Figure 5:
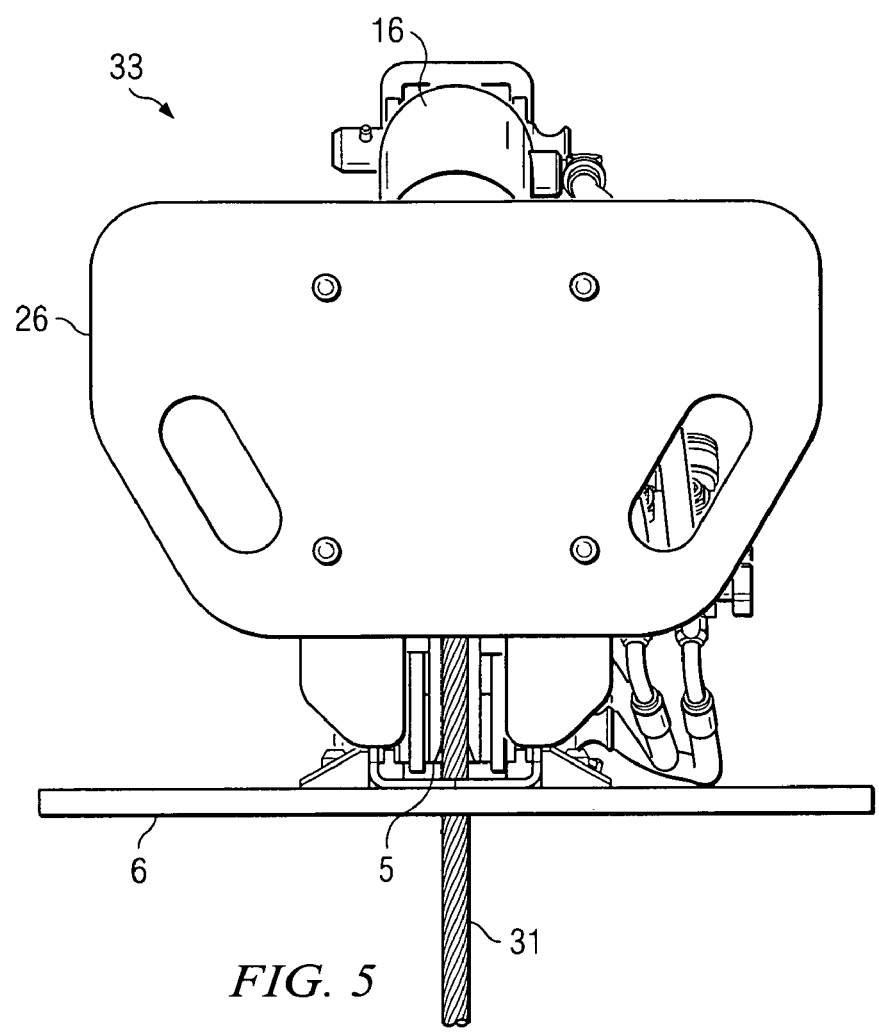
FIG. 5 is a bottom view of the device of FIG. 1.
Figure 6:
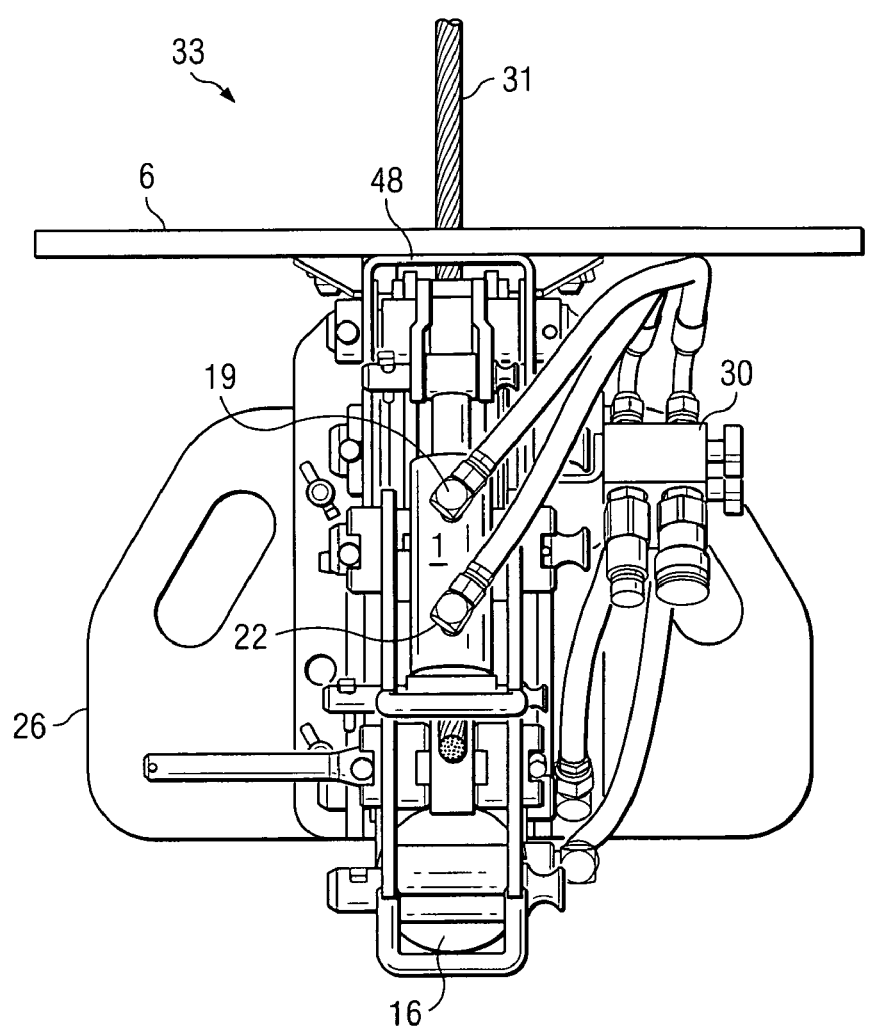
FIG. 6 is a top view of the device of FIG. 1.

Motion of links 8, 10 as described above brings the gripping contours or surfaces 17, 18 closer. This serves to clamp or grip the wire rope 31 with great force between the shoes 3, 4. This clamp load creates friction between wire rope 31 and shoes 3, 4. That friction is needed to apply the pulling force to the wire rope 31. The geometric configuration of the pins and links causes the relatively moderate force applied by extension cylinder 16 to be multiplied at shoe gripping surfaces 17 and 18. Linkages with multiplying lever effects can be designed in a variety of ways, of which the one presented herein is only one example. For better stability, link 8 preferably comprises a pair of side plates 90, 91 disposed on either side of link 8 and secured together by welded crossbars 92. Pins 9, 13, 14, and 53 are mounted in pairs of aligned holes in plates 90, 91 as shown. Plate 91 has an integral reinforcing bar 96 and bosses 97 on its outward side configured for mounting the pins 13 and 14 therein, as shown in FIG. 4, and similar structures are provided on the opposite side (FIG. 2).

A unique and important aspect of the geometry of links 8, 10 and shoes 3, 4 will be described in greater detail to gain a full understanding of the invention. By drawing a line from pin 13 to pin 14, the line of action of link 10 and shoe 3 is represented. In the illustrated embodiment, shoe 3 cannot pivot relative to link 10, but such a pivoting function could be provided. The line of action of link 8 and shoe 4 is represented by a line drawn from the center of pivot pin 14 perpendicular to gripping surface 18 and wire rope 31 held therein. In FIG. 8, these lines are approximately parallel. The motion of retracting cylinder 1 causes these lines of action to move in relative directions that take them away from the parallel condition, as demonstrated in FIGS. 9 and 10. Normally, links are made to be parallel to induce large forces. An example of this is the commonly-studied Vise Grip$_{tm}$ style pliers. In that case, a link length is adjusted to cause the components to minutely exceed the parallel link condition. Nearly parallel links function to multiply forces greatly as they act much as infinite ratio levers.

Figure 10:
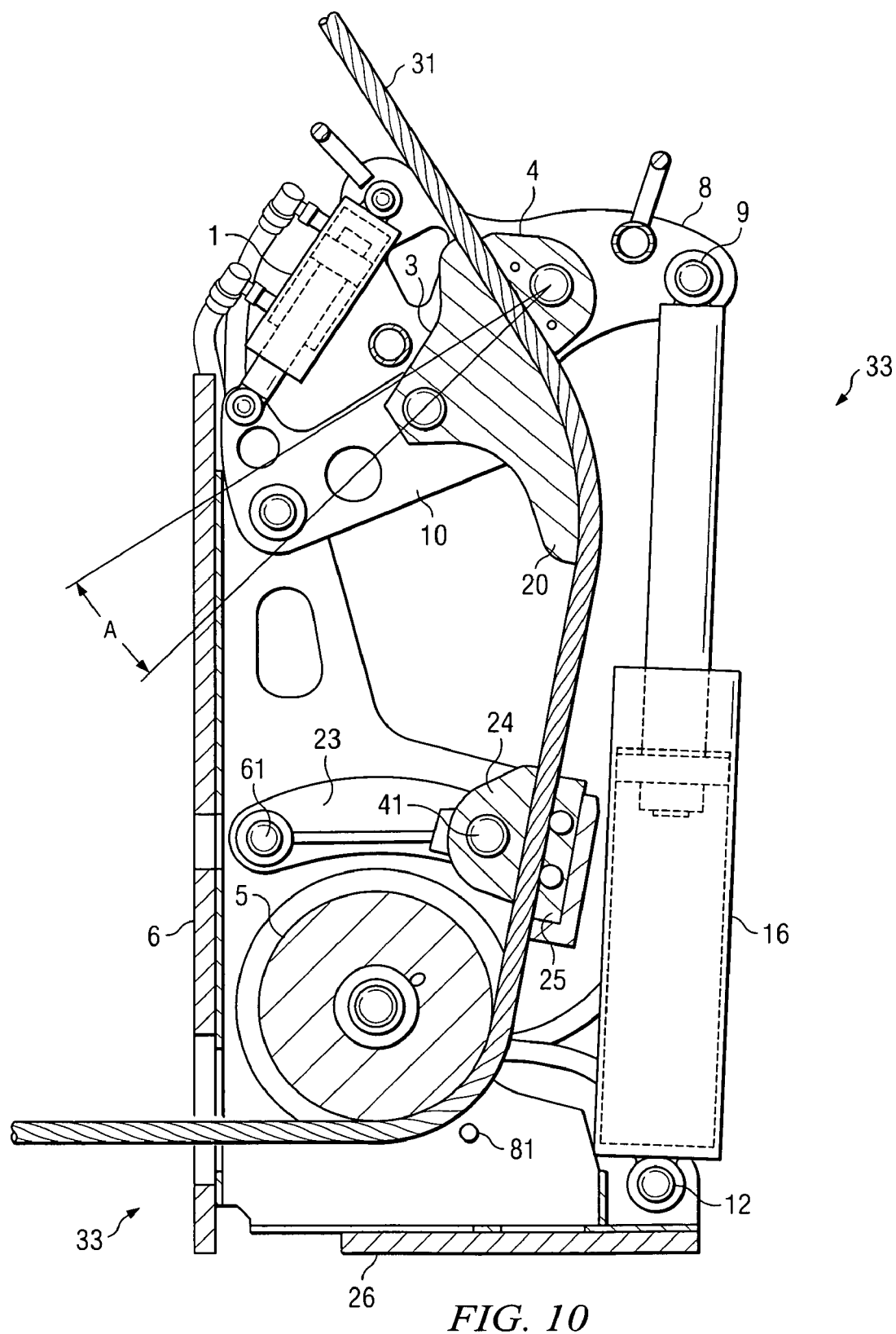
FIG. 10 is a sectional view taken along the line 8–8 in FIG. 1, with the device shown pulling the wire rope.

As shown in FIG. 8, in a starting position, the distance between shoe contours 17 and 18 is at its greatest. As the cylinders 1 and then 16 are actuated, the links 8, 10 move beyond parallel (past center) such that an angle A which is an acute angle defined by the lines of action referred to above changes from 0 degrees to a value greater than 0 degrees, preferably in the range from 5 to about 15 degrees, 12° in the example shown. To make this geometry change a benefit, shoes 3 and 4 are configured about pivots 13 and 14 to cause gripping surfaces 17 and 18 to become closer together as links 10 and 8 move angularly away (i.e., as angle A increases.) As link 8 rotates about pin 13 in a direction induced by retraction of latching cylinder 1, shoe 4 orbits (moves along an arc) about pin 13. The contour of gripping surface 17 on shoe 3 is nominally aligned with the wire rope 31 extending around sheave 5. When wire rope 31 is present and wrapped about sheave 5, angular movement of link 8 and shoe 4 in the direction previously described causes gripping surfaces 17 and 18 to become closer together and wire rope 31 wraps around extension 20 as shown in FIG. 10. This mechanism yields an advantage of operating successfully within a limited range of cable diameters without the need to replace shoes 3, 4 with shoes having differently sized gripping surfaces 17, 18.

Continued chronological description of the operation takes up with the sequencing valve 30 experiencing the predetermined hydraulic pressure threshold. Main cylinder 16 then receives oil flow to inlet port 15. This flow, instigated by the logic of the sequencing valve 30, serves to extend cylinder 16 and thereby induce further linkage displacement of all pivoted members previously described. This displacement creates yet more clamp load between shoes 3 and 4. Additional clamp load, over and above that produced by the latching cylinder 1, is required to achieve the desired pulling forces. The linear movement of the wire rope 31 and therefore the useful progress of the pipe bursting process is mathematically related to, but not of the same magnitude as, the extension of cylinder 16. The assembly of links 8, 10 is essentially rigid once the wire rope clamping forces are applied by shoes 3 and 4.

In the configuration shown, the force applied by cylinder 16 is multiplied by approximately 1.5 times. Similarly, the travel of rope 31 per stroke is 65% of the cylinder stroke. As cylinder 16 is extended toward the maximum, the wire rope wraps around the tail end extension 20 of shoe 3 which has a constant radius relative to pin 11. This holds wire rope 31 straight between sheave 5 and shoes 3, 4 and eliminates kinking of wire rope 31, as is needed to allow the stroke distance of the device to be maximized.

Depending on the flow rate of the hydraulic power source and the cross sectional displacement of cylinder 16, it may take 2 to 10 seconds to extend cylinder 16. Upon reaching the end of its stroke, cylinder 16 will bottom internally and cease movement. For the unit disclosed herein, the operator would then shift the aforementioned manual spool valve handle 37, which may be optionally mounted to mobile control stand 36. The spool valve 45 is placed in the flow path between the wire rope pulling machine 33 and the hydraulic power source, not shown. That source may be a custom designed power unit optimized hydraulically for use with the puller, or it may be borrowed flow from a piece of mobile equipment such as a skid steer loader or backhoe. Extended length hoses 38 and 39 terminate at the hydraulic power source.

Other hydraulic valves such as electric spool valves, valves mounted on the mobile equipment supplying the hydraulic flow, or logic enhanced devices can be configured to shift flow direction. Upon this shift, sequence valve 30 may again execute its task of delivering flow to the designated circuits in sequential order. This order would first cause delivery of fluid to port 22 of latching cylinder 1. The reversal of load on this cylinder enables shoes 3 and 4 to release clamp load from wire rope 31.

Figure 11:
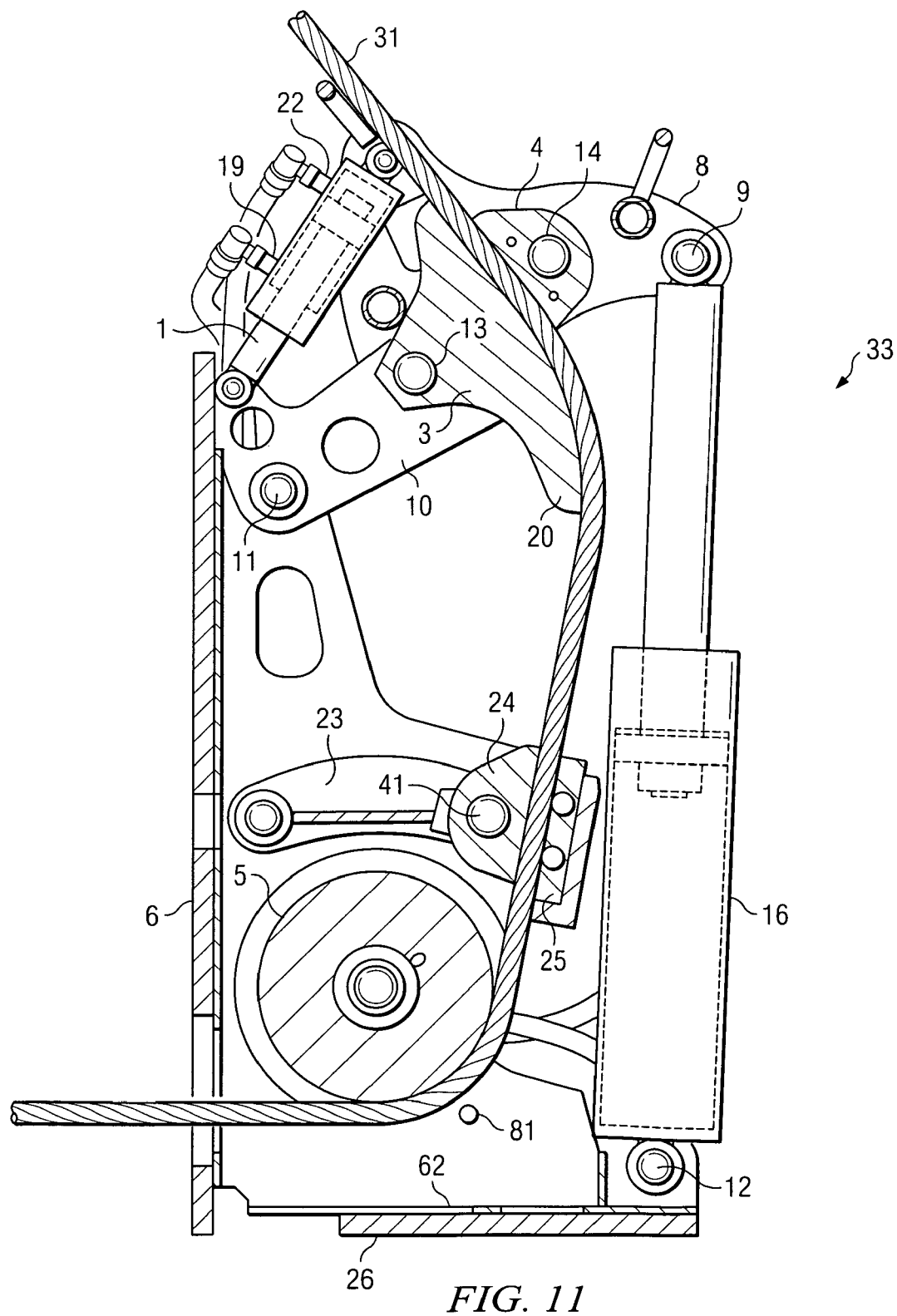
FIG. 11 is a sectional view taken along the line 8–8 in FIG. 1, with the device shown releasing the wire rope.
Figure 12:
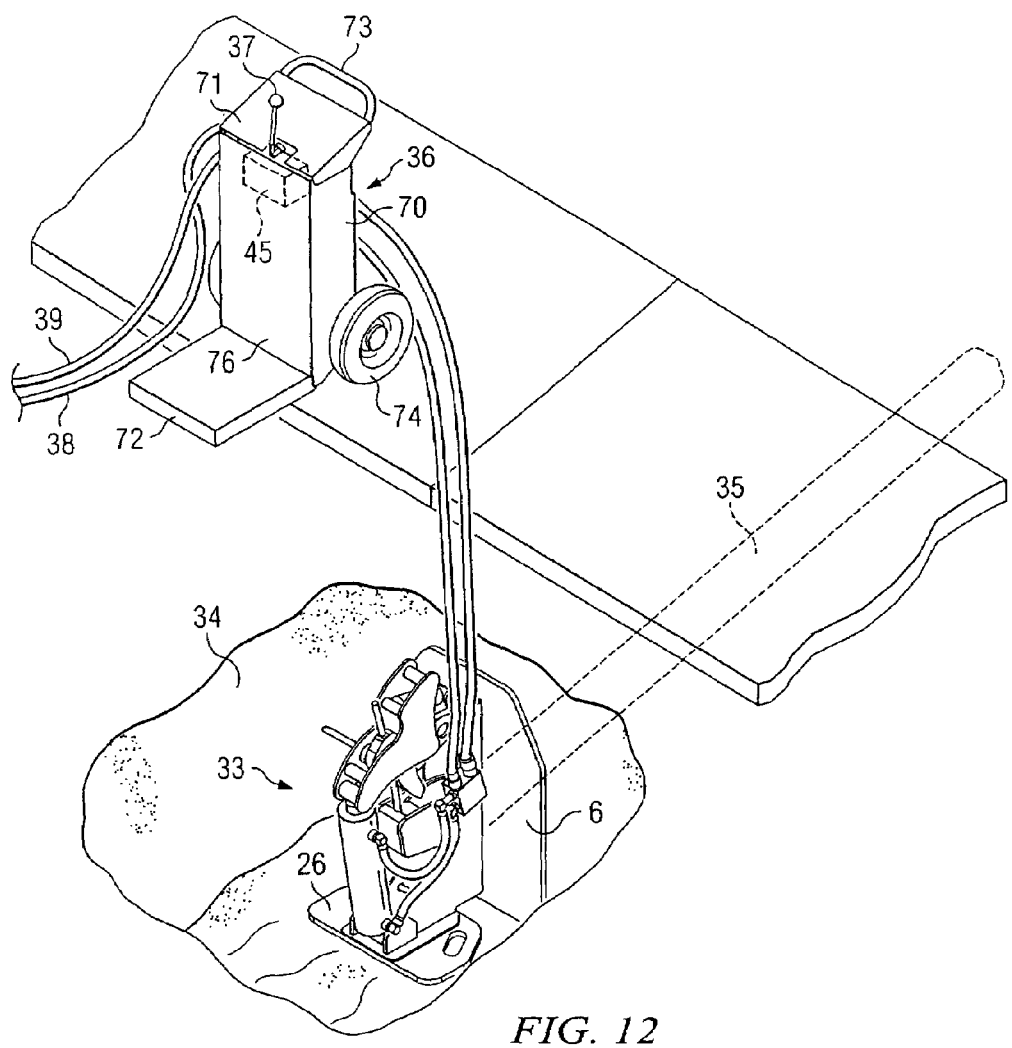
FIG. 12 shows the pulling device of FIGS. 1–11 connected to a control stand according to the invention.

The sequence valve 30 will again achieve a predetermined threshold pressure and shift flow to the second circuit in its logic scheme. This second circuit is port 21 of cylinder 16. Port 19 of cylinder 1 and port 15 of cylinder 16 will be connected to the return circuit through sequence valve 30 and spool valve 45. This flow direction will cause cylinder 16 to retract, pulling pin 9 toward the body of cylinder 16. With cylinder 16 swinging the system of links 10 and 8, along with shoes 3 and 4, back in the direction it had been pulled from, the tension in wire rope 31 will begin to lessen; see FIG. 11. At this point, the configuration of the pulling device as well as the nature of the pipe bursting work will determine what happens next. Specifically, there may be substantial tension on wire rope 31 tending to pull it back the way in the reverse of the pulling direction, and if so, the apparatus will respond differently than if there is no such tension.

In a simplified version of the device, no means for preventing reverse travel of the cable between pulling strokes is provided. In that case, the wire rope tension is relieved totally through reverse travel of the system. The clamp load on the wire rope is not released from shoes 3 and 4 until the elastic stretch resulting from tension in the rope is nearly zero. In typical pipe bursting operations, especially for laterals where the length of the wire rope under tension is less than 100 feet, that stretch will normally be negligible and of have no effect on the operation. For longer pulls, such as bursting of mains, where the distance is often over 400 feet, the stretch may be 0.5% of the tensioned cable length at some points. Additionally, elastic pipe trailing behind the bursting device may have friction induced on its outer skin. This friction is the result of soil memory, where the soil attempts to return to it's original unexpanded condition over a period of 1 to 5 hours. It is common for product pipe stretch to be considerable when bursting long distances in clay soils having a high plasticity index or swelling tendency.

In the case of longer pulls, a cable holding mechanism 60 including a pivoting arm 23, a movable shoe 24 and a stationary shoe 25 should be employed. These components restrain wire rope 31, holding it in tension, while cylinder 16 traverses the reverse portion of the stroke and lowers the linkage for the next stroke. This mechanism 60, while not as efficient as the primary system of links 8, 10 and shoes 3, 4, serves to minimize the loss of distance due to elastic cable stretch. It may, however, allow some return of the rope to occur before the cycle of the main pulling shoes is reinitiated.

Since shoes 24, 25 are not required to pull through a distance, and their dependable engagement is not critical to completing a job, their design can be simplified. This simplification saves cost of manufacture and more importantly, reduces overall device size of the pulling machine 33. Arm 23 is mounted to the frame 48 by a pivot pin 61. Shoe 24 is pivotally mounted to the remote end of arm 23 by a pin 41 in a manner similar to shoe 4 and pin 14. Opposing stationary shoe 25 is rigidly bolted on pinned to side walls 28 and 29 of the frame 48.

Arm 23 serves as a stop mechanism because it causes shoes 24, 25 to move to a wedged position when wire rope 31 reverses direction. When rope 31 is moved in a productive direction (upward in the configuration shown), arm 23 swings a short distance upwardly (FIG. 10) and allows the shoe 24 to swing free, merely dragging on the surface of the passing rope 31. Cylinder 16 can retract its full stroke length in order to start another stroke while shoes 24 and 25 hold wire rope 31 stationary.

Sheave 5 is mounted on frame 48 just below holding mechanism 60 to change the direction of wire rope 31 from the horizontal plane in which pipes are laid to vertical. This serves to keep the working mechanism out of the mud and sewage that will foul the excavation bottom. It is, however, optional since other means to accomplish this task could be employed. A cable retention pin 81 is position below and inside sheave 5 near the center of the position at which wire rope 31 angles upwardly. Pin 81 ensures that relaxation of wire rope 31 will not allow it to fall completely away from sheave 5 and become jammed to one side of it when pulling tension is resumed.

Frame 48 includes base plate 62, end wall 59, and side walls 28 and 29 which interconnect plate 62 and wall 59. Foot plate 26 supports the pulling device 33 prior to and after application of wire rope tension. It underlies base plate 62 and is wider and thicker than plate 62 to provide secure support (see FIG. 7). Plate 26 is removably attached to plate 62 by removable connectors such as spring-loaded linch pins 63. Face plate 6 abuts the pipe being burst and is similarly removably attachable to end plate 59 by further linch pins 63. Plate 6 serves to transfer the wire rope load from the pulling device 33 to the existing pipe or the surrounding soil. Side walls 28 and 29 provide surfaces to mount pivot pin bushings and the axle 7 for sheave 5.

Note that all systems are attached to one another in such a manner that the machine may be easily disassembled or assembled by pulling the associated linch pins. This allows an operator to break the machine down into small lightweight components and transport them into difficult to access locations such as basements or deep excavations. Plates 6 and 26 may be positioned at the site and then connected by connectors 63 to frame 48 of the pulling device 33.

Figure 13:
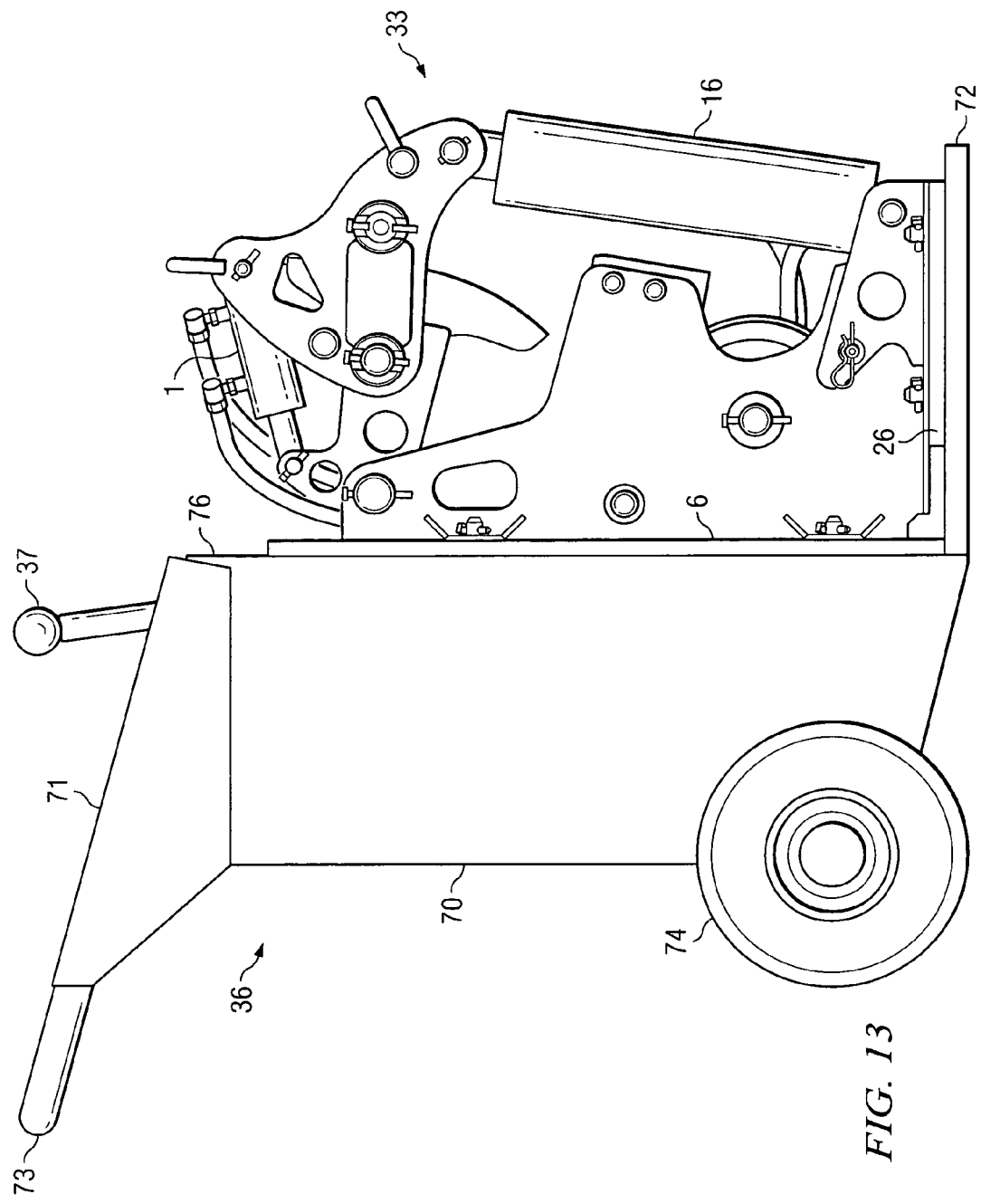
FIG. 13 is a side view showing a pulling device of the invention in position for transport on the control stand.

Pulling machine 33 is preferably transported using mobile control stand 36 as a dolly as shown in FIG. 13. For this purpose, stand 36 has a housing 70 with an upper end control panel 71, a frontwardly extending lifting platform 72, a rearwardly extending handlebar 73 and a pair of wheels 74 positioned at the lower rear corner of housing 70 so that device 33 may be positioned as shown and transported by tilting housing rearwardly on wheels 74 and manually moving stand 36 and device 33 in the position shown. Platform 72 and a front wall 76 of housing 70 may be configured to match the dimensions of device 33.

Set-up of the device 33 in an excavated pit 34 involves assembling the device over the wire rope 31 to be tensioned, or else threading the wire rope 31 through the pre-assembled device. One method is to place foot plate 26 on the excavation bottom and face plate 6 on the excavation wall adjacent the existing pipeline, then bring device 33 into position and secure plates 6, 26 as described above. In the alternative, device 33 may be set into position preassembled.

Figure 7:
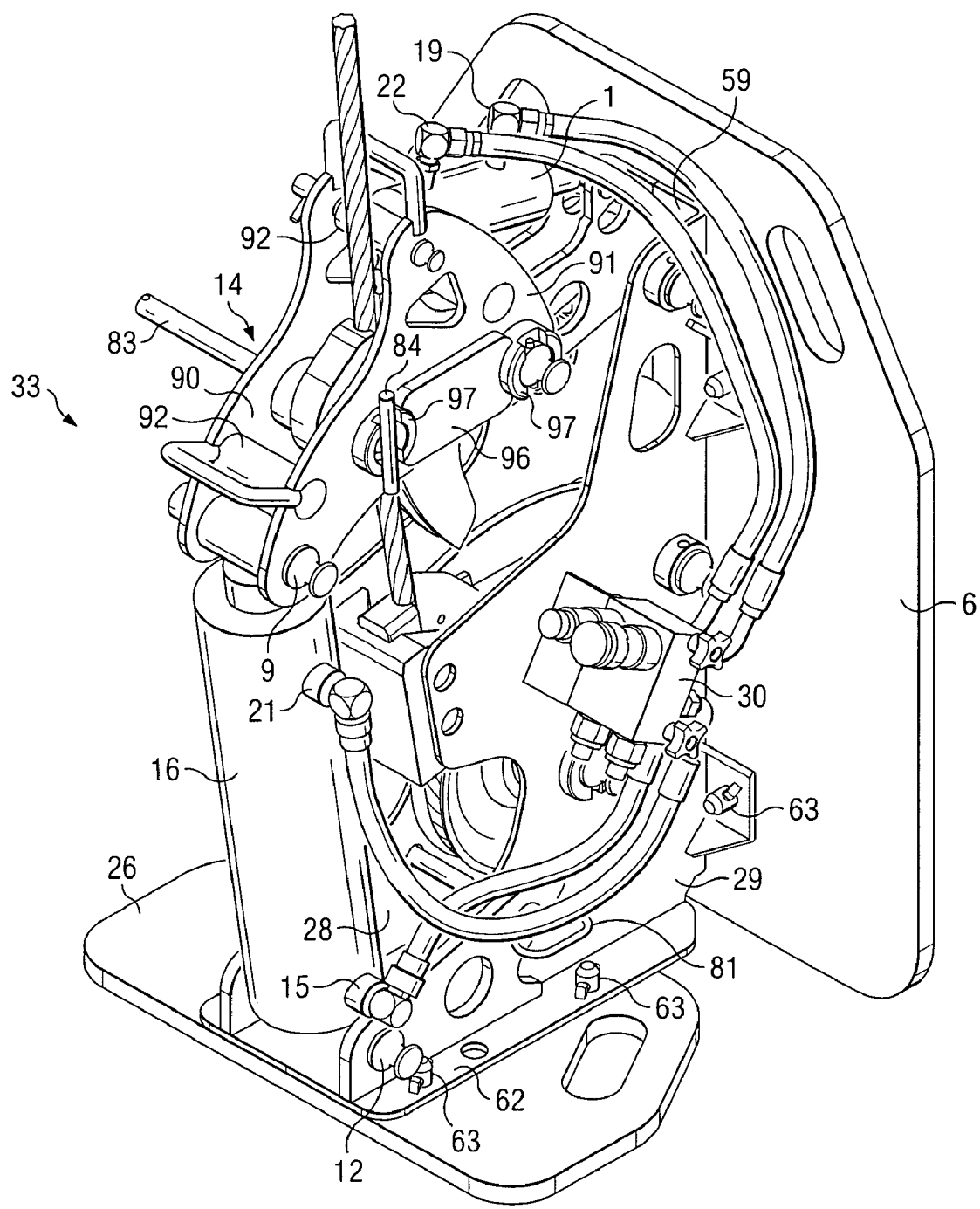
FIG. 7 is a perspective view of the device of FIG. 1.

Wire rope 31 is threaded through the existing pipe line 35 and through hole 32 in face plate 6 with the machine 33 tilted on its back so that wire rope 31 does not have to bend at sheave 5. Using this method, it is convenient to remove cable retention pin 81 and stationary shoe 25 to provide easier access. Pin 14 in this embodiment has a main top end portion 82 having the diameter shown in FIGS. 4–6 and a bottom end reduced diameter portion 83. Reduced diameter end portion 83 normally protrudes as shown in FIG. 7. When pin 14 is pulled half way out by its T-shaped top 84, reduced diameter end portion 83 permits shoe 4 to loosen relative to shoe 3, and permits the wire rope to be manually threaded between shoes 3, 4. Once wire rope 31 is in position, pin 14 is pushed back in to its normal position, pin 81 is reinserted, and stationary shoe 25 is set back into position with bolts or pins. The unit is then tipped upright to the pulling position shown in FIGS. 4–6, bending the wire rope 90 degrees around sheave 5 as shown. Upon completion of the job, the wire rope is removed and pulling machine 33 may be partially disassembled or left fully assembled as desired.

While certain embodiments of the invention have been illustrated for the purposes of this disclosure, numerous changes in the method and apparatus of the invention presented herein may be made by those skilled in the art, such changes being embodied within the scope and spirit of the present invention as defined in the appended claims.

What is claimed is:

1. A cable pulling machine, comprising:
   a frame;
   a mechanical linkage including first and second links having first and second cable gripping shoes disposed thereon respectively in opposed positions;
   a latching cylinder actuable to cause the mechanical linkage to pivot on multiple axes to bring the shoes into engagement with a cable disposed therebetween;
   a main cylinder having one end mounted on the frame and actuable to move the linkage in a manner effective to pull the cable in a pulling stroke once the latching cylinder has brought the shoes into engagement with the cable; and
   means for extending and retracting the main and latching cylinders.

2. The machine of claim 1, wherein the first link is secured to the frame by a first pivot at one end portion of the first link, and has the first shoe mounted thereon at a position offset from the first pivot, the first shoe having a first gripping surface configured for gripping the cable, the second link is secured to one end of the main cylinder, the second shoe having a second gripping surface configured for gripping the cable, which second gripping surface opposes the first gripping surface, and the latching cylinder is mounted at opposite ends thereof to the first and second links at positions effective for causing the first and second gripping surfaces to grip a cable disposed therebetween.

3. The machine of claim 2, further comprising a second pivot at which the second link is connected to an end of the main cylinder opposite the main cylinder end connected to the frame, and the second link has the second shoe mounted thereon at a position offset from the second pivot.

4. The machine of claim 3, wherein the latching cylinder is pivotally mounted by third and fourth pivots mounted in holes in the first and second links respectively.

5. The machine of claim 4, wherein at least one of the shoes is pivotally mounted to its associated link by a shoe pivot, on which the shoe pivots as it tightens on the cable.

6. The machine of claim 4, where the first and second links overlap one another in a lateral direction transverse to the pulling stroke, and are interconnected for relative rotation by a fifth pivot, the fifth pivot being located between the first and second pivots at a position effective to cause the links to bring the shoes together to grip the cable upon actuation of the latching cylinder.

7. The machine of claim 6, wherein the linkage is configured to mechanically magnify gripping force applied to the cable by the latching cylinder, which latching cylinder exerts less force than the main cylinder.

8. The machine of claim 7, further comprising a sixth pivot by which one end of the main cylinder is attached to the frame.

9. The machine of claim 8, further comprising a control unit including:
   a circuit valve which, upon actuation for a pulling stroke, activates the latching cylinder until a predetermined pressure is reached, and then activates the main cylinder; and
   a manual control for cycling the machine to perform a pulling stroke and then reset to a starting position to repeat for a successive pulling stroke.

10. The machine of claim 9, further comprising means for holding the cable in tension between pulling strokes.

11. The machine of claim 10, wherein the frame is generally L-shaped including a side wall and a bottom wall which act as reaction surfaces for the cable pulling machine, the first pivot is attached by a first bracket to the side wall of the frame, and the sixth pivot is attached by a bracket to the bottom wall of the frame.

12. The machine of claim 1, wherein at least one of the shoes is pivotally mounted to its associated link by a shoe pivot, on which the shoe pivots as it tightens on the cable.

13. The machine of claim 1, further comprising a control unit including:
   a circuit valve which, upon actuation for a pulling stroke, activates the latching cylinder until a predetermined pressure is reached, and then activates the main cylinder; and
   a manual control for cycling the machine to perform a pulling stroke and then reset to a starting position to repeat for a successive pulling stroke.

14. The machine of claim 1, wherein the linkage mechanically magnifies forces applied to the cable by the latching cylinder, which latching cylinder is smaller than the main cylinder and exerts less force than the main cylinder.

15. The machine of claim 1, further comprising means for holding the cable in tension between pulling strokes.

16. The machine of claim 1, wherein one of the cable gripping shoes has a curved extension, and the linkage pivots to wrap the cable about the extension at the end of a pulling stroke.

17. The machine of claim 1, wherein the frame is generally L-shaped including a side wall and a bottom wall which act as reaction surfaces for the cable pulling machine.

18. The machine of claim 17, wherein the side wall of the frame has a cable opening therein, and a sheave rotatably mounted on the frame proximate the cable opening whereby a cable extending through the cable opening is wound around the sheave as it extends from the sheave to the cable gripping shoes.

19. The machine of claim 18, further comprising an arm pivotally mounted on the frame intermediate the sheave and the cable gripping shoes, the arm having means on a distal end thereof for arresting return movement of the cable between pulling strokes.

20. A pipe bursting system, comprising:
a cable pulling machine including a frame, a mechanical linkage including first and second links having first and second cable gripping shoes disposed thereon respectively in opposed positions, a latching cylinder actuable to cause the mechanical linkage to pivot on multiple axes to bring the shoes into engagement with a cable disposed therebetween, a main cylinder having one end mounted on the frame and actuable to move the linkage in a manner effective to pull the cable in a pulling stroke once the latching cylinder has brought the shoes into engagement with the cable, and means for extending and retracting the main and latching cylinders, wherein lines of action for each link move from an initial substantially parallel position to a non-parallel position effective to magnify clamping force exerting by the gripping shoes;
a cable configured to be pulled by the cable pulling machine; and
a mole attachable to one end of the cable, the mole configured for bursting an underground pipeline.

21. A cable pulling machine for pulling a pipe bursting mole through an underground pipeline, comprising:
a frame;
a mechanical linkage including a pair of first and second cable gripping shoes disposed in opposed positions, first and second links having the first and second cable gripping shoes mounted thereon, a first pivot by which the first gripping shoe is pivotally mounted to the first link and a second pivot on which the first and second links are mounted for relative rotation;
a latching cylinder actuable to cause the mechanical linkage to bring the shoes into engagement with a cable disposed therebetween; and
a main cylinder having one end mounted on the frame and actuable to move the mechanical linkage in a manner effective to pull the cable in a pulling stroke once the latching cylinder has brought the shoes into engagement with the cable, which movement of the main cylinder during the pulling stroke generates additional clamp load by the first and second cable gripping shoes on the cable.

22. The machine of claim 21, wherein the mechanical linkage further comprises a third pivot by which one end of the latching cylinder is pivotally mounted to the first link.

23. The machine of claim 21, further comprising means for extending and retracting the main and latching cylinders.

* * * * *